(12) United States Patent
Klinker et al.

(10) Patent No.: US 8,793,666 B2
(45) Date of Patent: Jul. 29, 2014

(54) MULTIDIMENSIONAL DEBUGGER

(75) Inventors: Boris Klinker, Karlsruhe (DE); Balko Soren, Weinheim (DE); Reiner Hille-Doering, Karlsruhe (DE); Markus Richter, Karlsruhe (DE)

(73) Assignee: SAP AG, Walldorf (DE)

( * ) Notice: Subject to any disclaimer, the term of this patent is extended or adjusted under 35 U.S.C. 154(b) by 1061 days.

(21) Appl. No.: 12/644,024

(22) Filed: Dec. 22, 2009

(65) Prior Publication Data
US 2011/0154301 A1   Jun. 23, 2011

(51) Int. Cl.
*G06F 9/44* (2006.01)
*G06F 11/36* (2006.01)

(52) U.S. Cl.
CPC .......... *G06F 11/362* (2013.01); *G06F 11/3664* (2013.01)
USPC ........................................................ 717/135

(58) Field of Classification Search
None
See application file for complete search history.

(56) References Cited

U.S. PATENT DOCUMENTS

| 8,196,109 B2 * | 6/2012 | Fung et al. ..................... 717/125 |
| 2002/0087950 A1 * | 7/2002 | Brodeur et al. ............... 717/124 |

* cited by examiner

*Primary Examiner* — Henry Tsai
*Assistant Examiner* — Juanito Borromeo
(74) *Attorney, Agent, or Firm* — Soroker-Agmon

(57) ABSTRACT

A computer system for programming applications in a programming environment, including, a computer adapted to execute software to form a programming environment enabling creation of a software application using multiple programming languages, a multidimensional debugger installed on the computer; wherein the multidimensional debugger is made up from two or more debuggers each for use in debugging a different programming language, wherein the two or more debuggers use a common work memory to share information; and wherein the two or more debuggers use a common user interface.

10 Claims, 2 Drawing Sheets

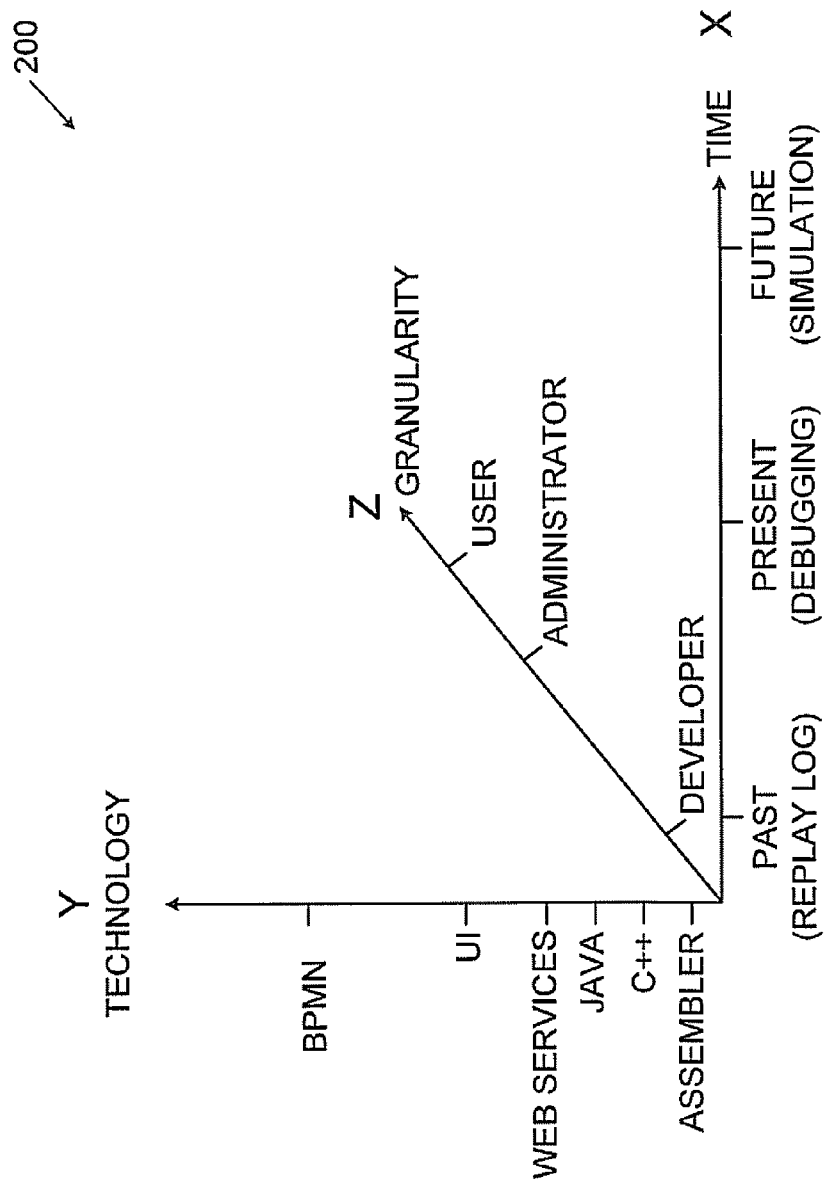

MULTIDIMENSIONAL DEBUGGER

FIELD OF THE INVENTION

The present invention relates generally to a software debugger and more specifically to a software debugger that supports a variety of debugging modes.

BACKGROUND OF THE INVENTION

When developing software applications the developer is generally required to test the application to verify that it performs its intended function. This is true for any programming language, for example for programming in assembler, C++, Java, or for programmable platforms such as business process model (BPM) applications. Typically each type of programming application may be provided with debugging tools or a debugging application to aid the programmer in verifying correctness of the application and/or locating errors.

Generally, a debugger allows the user to select breakpoints at which prosecution will halt and the user can view the contents of selected memory locations and/or variables used in the program, so that the user can determine if the program is functioning as planned. Typically, each type of programming language or programmable platform uses different debugging tools that are adapted to function with the respective language and handle the specific processes supported by the language.

In some programming platforms such as business process models (BPM), there exists a programming environment that combines processes that may be prepared by multiple languages, wherein each language specializes in the problem being dealt with. As an example the programming aspects may include control flow, data flow, message flow and other aspects, each being supported by different programming tools. Likewise, a business process may be made up from many distinct procedures, such as workflow graphs, data entry, mapping definitions, custom user code snippets, web service endpoint URL's and the like. The various elements are programmed using different programming tools, for example BPMN, XSLT, Java, XML/SOAP. Each element may use different runtime stacks (e.g. BPEL engines, XSLT processors, JEE servers, Web service stacks etc.).

When programming the various parts of a business process the user needs to use multiple debugging tools, each dealing with a specific part of the business process. This inhibits the transfer of parameters from one debug unit to another and prevents setting conditional breakpoints in one process based on the execution of a different process. As a result is impossible to jointly debug or analyze multiple correlated processes, or lifecycle stages of a business process in a single debugging experience. Instead complex programs in a programming environment need to be debugged piece by piece. An interrelated process cannot be debugged as a single unit with other processes, for example debugging process logs, or message flow through underlying technologies such as web service connectivity. Additionally, debugging piece by piece is also wasteful in consuming the environment stack and other resources of the programming environment, since each debugger requires its own memory allocation.

SUMMARY OF THE INVENTION

An aspect of an embodiment of the invention, relates to a multidimensional debugger functioning in a programming environment on a computer. The multidimensional debugger incorporates the debugging ability of multiple debuggers that are each adapted to debug a specific process perspective of the programming environment or specific programming language or tool used to prepare procedures of the programming environment. The multidimensional debugger uses a common workspace and set of rules for the transition from one debugger to the other debuggers, so that one debugger can respond to events monitored by a different debugger. The multidimensional debugger includes a common interface so that the user need only relate to a single debugging tool to cover the entire process. Alternatively or additionally, the multidimensional debugger may be set to debug a specific part of the entire application, for example procedures in a specific language or procedures dealing with specific tasks of the application, for example network accesses, or control flow.

In an exemplary embodiment of the invention, the multidimensional debugger also supports one or more additional dimensions of debugging.

In an exemplary embodiment of the invention, the multidimensional debugger also supports multiple lifecycle stages of a programming environment application. Optionally, the lifecycle includes:
1. Past processes—analyzing the results of previous executions of the application.
2. Present processes—debugging currently running applications.
3. Future processes—performing simulated runs of future executions of the application with selected parameters.

In an exemplary embodiment of the invention, the multidimensional debugger supports different perspectives of the debugging process. Optionally, the perspectives include different levels of granularity, for example:
1. High level debugging—determination of the success and failure of applications performed by a user during use of the application and/or determining measures of the application, for example turnaround time of a specific process.
2. Medium level debugging—determination of the success and failure of specific processes of the application.
3. Low level debugging—debugging at the command level of the programming language being debugged, for example checking values of variables and memory locations.

In some embodiments of the invention, further perspectives may be defined that differ in the aspects covered by the debugger. Optionally, certain users may be permitted to perform low level debugging, for example the application programmers, whereas other users may be limited to performing high level debugging, for example an application user. Optionally, some users may be allowed to perform medium level debugging, for example system administrators or users that are specifically trained to perform a higher level of problem determination than a standard user.

In some embodiments of the invention, during a specific use the debugger may be set to handle a specific level in each dimension, for example control flow in the process dimension, past debugging in the time dimension and medium level as the perspective level.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein:

FIG. 2 is a schematic graph illustrating three main dimensions that may be supported by a multidimensional debugger, according to an exemplary embodiment of the invention.

DETAILED DESCRIPTION

Figure 1:
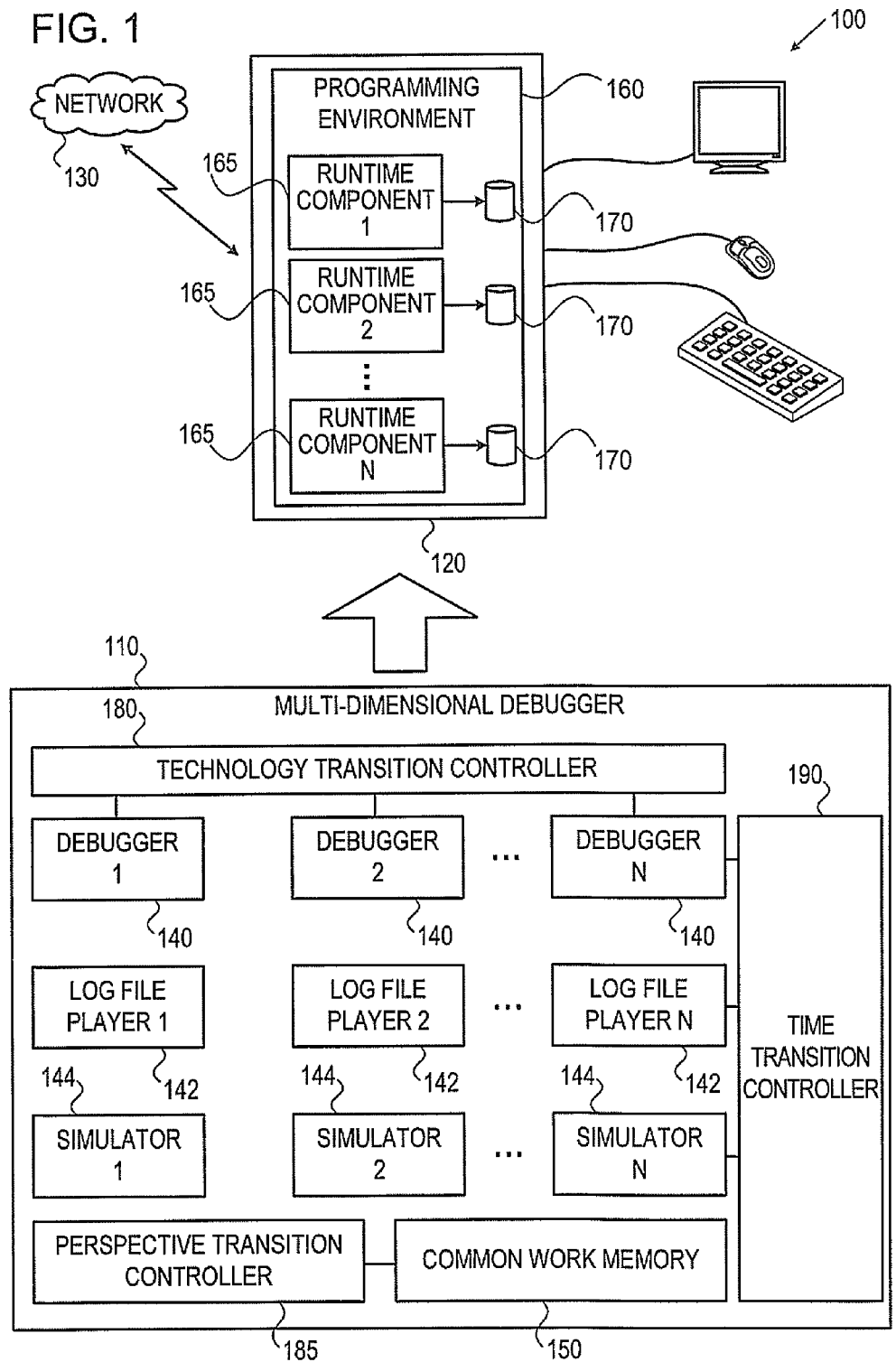
FIG. 1 is a schematic illustration of a system using a multidimensional debugger for debugging a programming environment running on a computer system, according to an exemplary embodiment of the invention.

FIG. 1 is a schematic illustration of a system 100 using a multidimensional debugger 110 for debugging a programming environment 160 running on a computer system 120, according to an exemplary embodiment of the invention. In an exemplary embodiment of the invention, programming environment 160 is a multi-language software development environment, for example "Eclipse" or Microsoft Visual Studio. In some embodiments of the invention, programming environment 160 is an operating system such as Unix or MS Windows. Optionally, programming environment 160 enables using multiple programming tools to form a complex application. The complex application is made up from multiple procedures, which may be each programmed separately using different programming languages and tools. Optionally, each procedure serves as an independent runtime component 165, using a matching debugger 140 for debugging the runtime component 165. In some embodiments of the invention, each runtime component 165, may create a logfile 170 when it is executed. In some embodiments of the invention, the complex application may be an enterprise business management system that may be implemented over a network 130 (e.g. Lan, Wan, Internet, intranet and the like). Optionally, the complex application may be a client server application or a peer to peer application, and the complex application may require handling various procedures such as communications, control flow, data flow, user interaction and other procedures.

In an exemplary embodiment of the invention, each runtime component 165 may be programmed using different programming languages that best fit the requirements of the runtime component 165. The collection of runtime components 165 is connected together to form the complex application. In prior art to debug the application a programmer invokes multiple debuggers independently and debugs each procedure on its own.

In an exemplary embodiment of the invention, multidimensional debugger 110 is created by connecting together multiple debuggers 140, for example a debugger for C++, a debugger for Java, a debugger for Business Process Modeling Notation (BPMN) applications, Business Process Execution Language (BPEL), a debugger for User Interface (UI) applications, a debugger for web services and other debuggers. In an exemplary embodiment of the invention, the debuggers are altered to enable cooperation between one debugger and another and transition controllers are added to provide a smooth transition between the various available modes. Optionally, the cooperation includes actions such as:

1. Responding together to breakpoint, for example when a breakpoint is met in one of the debuggers allowing the user to view and alter variables under the control of another debugger before resuming execution of all the procedures.

2. Stepping through applications simultaneously with multiple debuggers or by transitioning smoothly from one debugger to another, and checking variables of any of the applications during the stepping process.

3. Using a common work memory 150 to hold debugger variables and stacks, so that the variables are available and relevant to all the debuggers 140 simultaneously.

4. Using a perspective transition controller 185 that shapes and filters the complete debug user interface to fit the current user role. Optionally, the perspective transition controller 185, provides a seamless visual integration between the individual debuggers. In an exemplary embodiment of the invention, perspective transition controller 185, combines the call stacks of the debuggers in use. Optionally, perspective transition controller 185, renders the user interface (UI) that shows variables in an adequate fashion, e.g. using perspective-dependent syntax and naming. During transition of the perspective, the controller re-renders all UI elements and filters unneeded UI elements.

In an exemplary embodiment of the invention, the user may use perspective transition controller 185 to set options for all the debuggers simultaneously to prevent repetition in providing commands to the debuggers.

5. Hiding distribution aspects of an application, so that a user can debug one procedure without needing to deal with other procedures and simplify debugging when desired.

6. Collecting synchronized log information to allow analysis of previous executions of the overall system.

7. Providing a technology transition controller 180 that handles transition of the debugging process from one debugger to another. Optionally, technology transition controller 180 transfers breakpoints. In an exemplary embodiment of the invention, if a user is debugging a procedure with a first technology level (e.g. BPMN), the user may transit to a different technology level (e.g. UI). Optionally, technology transition controller 180 needs to check if the next debugger 140 is already in sync with the process. If not, it will establish the connection. To do this silently, it uses all relevant connection settings from the current debugger (e.g. Host name, protocol, and so forth). Additionally, the technology transition controller 180 also maintains a set of rules regarding performing transitions. Optionally, the set of rules includes the derivation of the entry breakpoint, so that the debugger will stop at the appropriate entry points when receiving control from another debugger.

8. Providing a time transition controller 190 that allows the transition from past debugging (logfile replay) to present (live) debugging and from present debugging to future debugging (simulation). In an exemplary embodiment of the invention, each debugger 140 is provided with a matching logfile player 142 and a simulator 144 to perform the user selection (e.g. by playing logfiles 170).

In an exemplary embodiment of the invention, the reverse direction may also be possible. In an exemplary embodiment of the invention, transition from Simulation to live debugging is only possible if the simulated artifact is correct and acceptable by the runtime. Transition from Live debugging to Logfile replay could be supported if the executed path in live debugging has a correspondence in the recorded log.

In an exemplary embodiment of the invention, during transition, the controller takes the current execution state (e.g. variable values, instruction pointers) from the current debugger and assigns it to the next one. The target debugger is responsible to recreate the state as exactly as possible. If the state was only partly recreated, time transition controller 190 can rollback the transition or inform the user that the continuation of the debugging session may be imprecise. In several situations the user would expect such state loss, as he can e.g. during simulation easily interact with the debugger and adjust the state to what he expects.

FIG. 2 is a schematic graph 200 illustrating three main dimensions that may be supported by multidimensional debugger 110, according to an exemplary embodiment of the invention. In an exemplary embodiment of the invention, multidimensional debugger 110 allows implementation of the debugging process along at least three dimensions as illustrated in FIG. 2. The dimensions include:

1. Different technologies (Y axis), for example different programming languages (e.g. Assembler, C++, Java, BPMN, BPEL), different procedures (e.g. web services, communications, user interfaces, data flow).

2. Different time frames (X axis), for example:
   (I). Present debugging by executing the debugging process on a live execution process;
   (II). Past debugging by executing the debugging process on previously executed executions, for example based on log file data.
   (III). Future debugging by executing the debugging process as a simulator based on the current state of the application, for example setting specific parameters to a future estimated value and checking execution of the entire system based on a simulated run.

3. Different perspectives (Z axis), for example different granularity levels, including:
   (I). High level debugging (e.g. for implementation by a user of system 100), which relates to high level aspects of the entire system such as the success or failure of actions taken by a user in using system 100, and/or the determination of measures of the application such as the time required for a specific process to perform.
   (II). Medium level debugging (e.g. for implementation by a system administrator), for example determination of the success or failure of specific procedures and controlling selectable system parameters.
   (III). Low level debugging (e.g. for implementation by a system developer or programmer), for example debugging at the command level of the programming language: setting breakpoints, stepping through processes and checking variables and contents of memory locations.

Optionally, each dimension may have more or less selection levels. In some embodiments of the invention, there may be other dimension in addition or instead of those listed here.

In an exemplary embodiment of the invention, a user of multidimensional debugger 110 may select a level from each of the available dimensions and execute a debugging session according to the selection. Optionally, certain users may be allowed to select all levels and certain users may be prevented from selecting some of the levels, for example an end user that uses the application may be allowed to run future simulations and determine estimated response rates when using the application but would be prevented from analyzing log files or running a current debugging session on actual code.

In some embodiments of the invention, users may be permitted to debug only specific procedures, for example procedures that they are the owner of. Optionally, they may execute other procedures but only change procedures that they own. In some embodiments of the invention, a user may be blocked from certain levels in one of the dimensions, whereas in other dimensions the user is not blocked and may select any level.

In an exemplary embodiment of the invention, multidimensional debugger 110 allows a user to freely move in the space that is created by the different dimensions and thus gives the user a smooth and unlimited debugging experience.

Optionally, the transition along the axis of any of the dimensions listed above is coordinated by technology transition controller 180, time transition controller 190 and perspective transition controller 185. Optionally, these controllers transfer the state silently. In an exemplary embodiment of the invention, combinations in the dimension space, that do not make sense are prevented from occurring by the controllers, for example stepping from BPMN to Assembler language does not make sense if the User perspective is currently set to a Business User.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

We claim:

1. A computer system for programming applications in a programming environment, comprising:
   a computer adapted to execute software to form a programming environment enabling creation of a software application using multiple programming languages;
   a multidimensional debugger installed on said computer; wherein said multidimensional debugger is made up from two or more debuggers each for use in debugging a different programming language;
   wherein the two or more debuggers use a common work memory to share information;
   wherein the two or more debuggers use a common user interface; and
   wherein the multidimensional debugger supports a perspective dimension, by allowing the user to select from a developer level of debugging; an administrator level of debugging and a user level of debugging for using one specific level in a debugging session with the different programming languages; wherein the developer level of debugging deals with debugging at the command level of the programming language, the administrator level deals with debugging at the procedural level, including determining success or failure of procedures and controlling procedure parameters, and the user level deals with determining success or failure of applications.

2. A computer system according to claim 1, wherein the multidimensional debugger can perform breakpoints that enable inspection of data from two or more application in different programming languages simultaneously.

3. A computer system according to claim 1, wherein the multidimensional debugger enables stepping through commands from two or more application in different programming languages simultaneously.

4. A computer system according to claim 1, wherein the multidimensional debugger enables stepping through commands from two or more applications in different programming languages while transitioning back and forth between the applications.

5. A computer system according to claim 1, wherein the multidimensional debugger supports a time dimension, by allowing the user to select lac a debugging session from debugging based on log files of past executions of the software application, debugging based on current execution of the software application and debugging of a simulation of future executions of the software application.

6. A computer system according to claim 5, wherein the multidimensional debugger includes a log file player that is adapted to play back log files recorded from prior executions of the software application.

7. A computer system according to claim 5, wherein the multidimensional debugger includes a simulator that is adapted to simulate execution of the software application.

8. A system according to claim 1, wherein a user may be enabled to select all levels in one dimension and prevented from selecting all levels in another dimension.

9. A computer system according to claim 1, wherein the perspective dimension level is selected based on the role of the user.

10. A computer system according to claim 1, wherein the user level of debugging also deals with determining the time required for execution of an application.

* * * * *